INVENTOR.
HERBERT F. COX. JR.

April 30, 1968    H. F. COX, JR    3,380,628
LIQUID MEASURING DEVICE
Filed Sept. 27, 1965    3 Sheets-Sheet 3

INVENTOR.
HERBERT F. COX, JR.
BY

United States Patent Office 3,380,628
Patented Apr. 30, 1968

3,380,628
LIQUID MEASURING DEVICE
Herbert F. Cox, Jr., 406 Sedgwick Drive,
Syracuse, N.Y. 13203
Filed Sept. 27, 1965, Ser. No. 490,455
11 Claims. (Cl. 222—1)

ABSTRACT OF THE DISCLOSURE

Measuring device employing a liquid measuring container having a disposable thin wall flexible liner therewithin adapted to fill out within the container with liquid from a source of liquid and having inlet and outlet valves for sequentially filling the liner, and permitting emptying by gravity, the device having means for rendering the device inoperative if insufficient liquid is available from the source to fill out the liner to the predetermined capacity of the measuring container.

---

This invention relates to liquid measuring devices for removing from a bulk container a predetermined quantity of liquid into a glass, cup or the like, and which may also be adapted to vending by coin control.

Dispensers, usually comprising a refrigerated cabinet for holding one or more multiple five gallon contains with a dispensing hose, and equipped with a pinch valve for the container hose from which a glass of milk or other liquid is quickly drawn, have become common in restaurants, institutions and the like, and have replaced, to a considerable extent insofar as milk is concerned, the use of disposable half-pint packages for restaurant use. A typical container used in such cabinet is shown in U.S. Patent 3,007,608, wherein a corrugated carton is provided with a loose fit oversize thin walled liner bag, which is filled out in supporting relation to the carton on filling through a hose attached to the liner. On inversion of the container, the hose becomes a means of dispensing the liquid. The hose, being of rubber like material, lends itself to pinch valve control. Such packages, known as single service, are discarded when empty. It will be understood, that as liquid is withdrawn from the liner bag, such bag collapses, so that no air is introduced into the product.

The present invention is directed to a liquid measuring device that is capable of automatically delivering into a glass, paper cup, or the like a fixed accurately measured portion of liquid from such a container. The device may be actuated by a coin box control, or by manual actuation. Provision is made for preventing the actuation of the device if the supply has become so exhausted as to be incapable of delivering the full fixed portion for which the device is set. The device is also so conceived as to be capable of being housed in the same cabinet with the supply package, and to utilize the discharge hose thereof in an automatically controlled manner. The device is also so constructed as to provide sanitary operation at all times, with provision for discarding the parts thereof that come in contact with the milk or other fluid as often as requirements dictate, such parts being readily replaceable, and of extremely low cost, so as to only slightly affect the cost of operation. The device is positive in operating and providing the measured quantity for which it is set, and is thus adapted for direct customer operation, whether by coin box control or otherwise. Heretofore, because of the failure to achieve one or more of the foregoing features, coin box dispensing of milk, for example, to individuals in restaurants has been restricted to individual disposable packages, of the type referred to, which otherwise are gradually being replaced by the dispensers and economical single service packaging methods herein above referred to.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
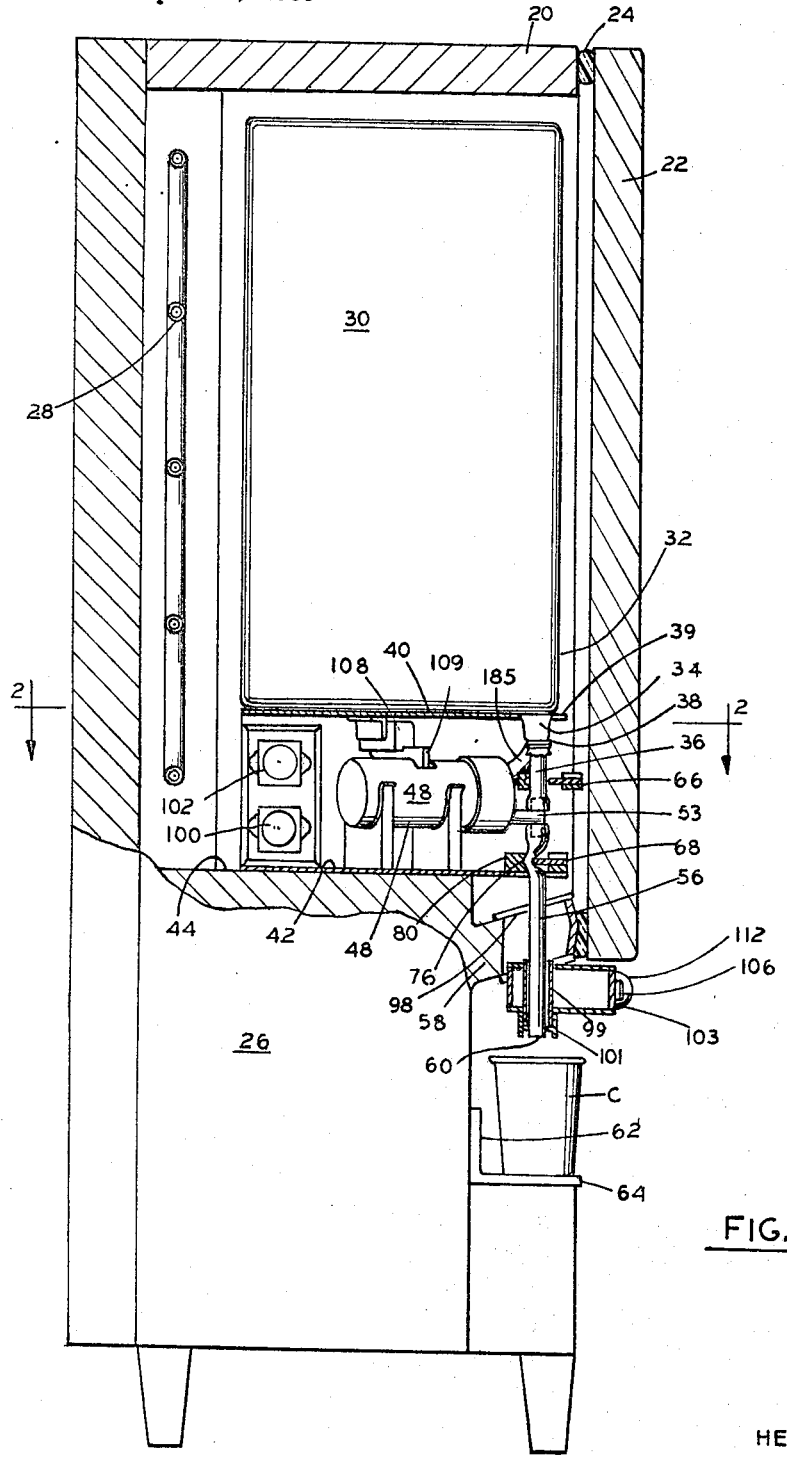
FIGURE 1 is a side elevational view of the measuring device in a cabinet, with parts broken away.
Figure 2:
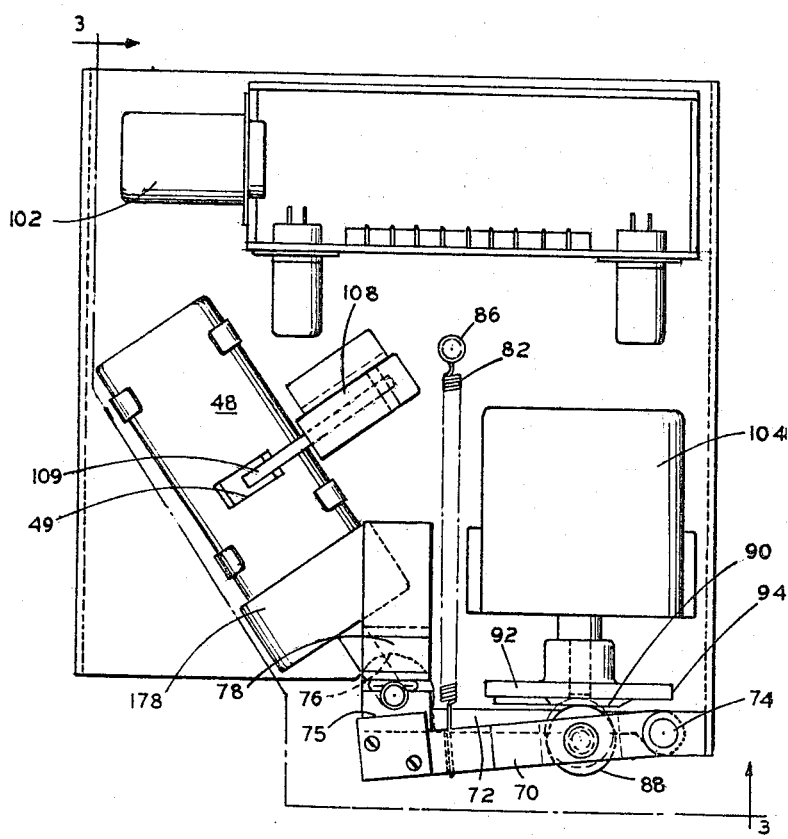
FIGURE 2 is a view of the measuring apparatus as seen below the line 2—2.

Referring to the drawings, a refrigerating cabinet 20, having a front door 22, with rectangular door gasket 24 is shown. Such cabinet may have refrigeration apparatus (not shown) in the base 26, with cooling coils in the area 28, to maintain a package, or packages of milk 30, at the optimum temperature for dispensing, such as 36 degrees Fahrenheit. Within the cabinet is disposed a dispensing container of either of the types shown in Cox 3,007,608 having a can, or a corrugated outer carton 32, and a liner bag 34 to which is attached a rubber or rubber like hose 36, such hose and the rosette 38 of the bag to which it is attached, being permitted to distend downwardly funnel-like, from the container assembly, in a recess 39 in the supporting shelf 40.

The supporting shelf 40 is the upper wall of a rectangular housing 42 placed upon the floor 44 of the refrigeration chamber. Within the housing is volumetric measuring means 46 in the form of a rigid cylindrical container 48, housing therein a collapsible thin walled plastic liner or bag 50, the liner being of a sufficient size so as to be adapted to fill out against the internal walls of the container 48, without stress. Opening into the plastic liner preferably at its lowest level, for alternate filling from the container 30, and discharge into a receptacle such as a drinking cup, is a T 53, one branch 52 of which is connected to the discharge tube 36 of the container 30, and the other branch 54 of which is provided with a short discharge hose 56, adapted to project downwardly through the lower inclined ledge 58 of the cabinet, to a discharge point 60, a suitable distance above a bracket 62 provided for holding a drinking cup C or the like thereunder. The stem 51 of such T opens into the bag 50, at a low level to permit gravity discharge thereof. The tray 64 of the bracket may be perforate and provided with a drain so that any drip, or accidental discharge, without a cup in position, will be led away in a sanitary manner.

Control of flow from the container 30 into the collapsible bag 50 and out flow therefrom is effected by a pair of pinch members 66 and 68, acting on the hose 36, above the T 50, and the discharge hose 56, below of the T, respectively, the pinch members either being both closed, or alternately one open while the other is closed. Actuation of the members 66 and 68 as by cam mechanism, motor actuated, may be employed. These members will hereinafter be referred to as valves.

Each of the pinch valves comprises a lever 70 and 72, pivoted on a vertical shaft 74 disposed to one side of the housing 42. Each pinch valve is provided with a rounded nose plate 75, adapted to pinch its respective hose, in the notch 76 provided in back up blocks 78 and 80. The levers 70 and 72 are biased to pinch positions by tension springs 82 and 84 extending horizontally towards the rear of the housing where an anchor 86 is provided.

Each of the pinch valve levers 70 and 72 are provided with rollers 88 and 89 respectively, riding on radially spaced face cams 90 and 92 of a disk 94, driven by a motor 104 of relatively fixed speed and having a suitable built-in reduction gear. The cam disk is also provided with a peripheral button 96, adapted to act upon a single pole double throw snap action switch 110 biased to one position, the switch being adapted to terminate motor operation upon completion of a single revolution of the cam disk at a time.

The container 48, having its flexible bag therein is provided with an aperture 49 in the top wall through which a feeler 109 of a liquid level switch 108 extends, the switch 108 being of the sensitive single pole single throw type, biased to the open position, and adapted to be closed when the liner bag 50 fills out with liquid, within the container 48, sufficient to indicate a volumetric quantity as desired. The discharge hose 56 extends downwardly through a fitting 98 affixed to the ledge 58, which fitting is provided with a vertical sleeve 99, and a removable collar 101, the latter having an aperture to provide a close fit around the tube end, to prevent cold air from escaping from the refrigeration compartment. Such fitting is provided with a mount 103 provided with a signal lamp 112 and start switch 106, conveniently disposed at the front of the cabinet.

Figure 3:
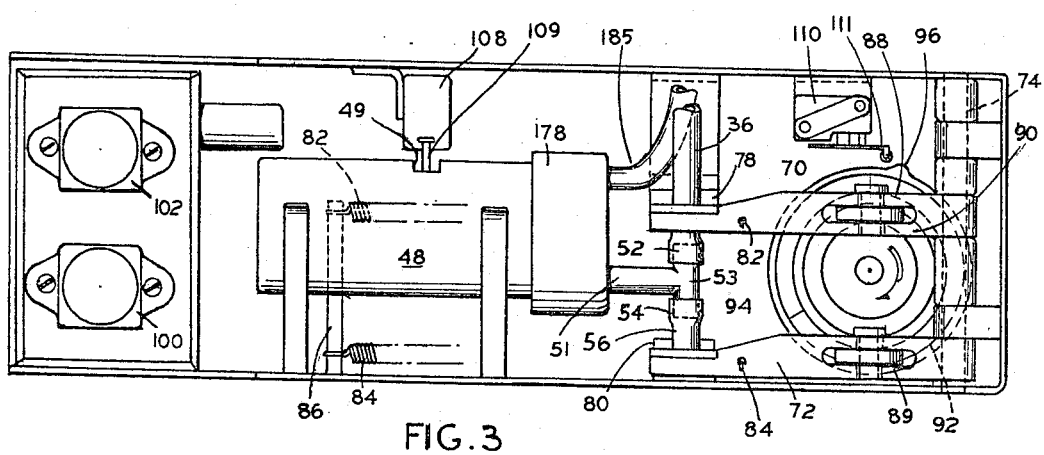
FIGURE 3 is a developed front and side view of the apparatus as seen from the line 3—3 of FIGURE 2.

The relationship of the cams 90 and 92 and the blister 96 on the disk 94 is indicated in FIGURE 3 where the cam switch 110 has a follower arm 111 engageable by the button 96, and the pinch valve levers and their rollers 88 and 89 are indicated in relation to the cams 90 and 92. As shown, disk 94 is in its normal ready position. Upon rotation of the disk, clockwise as indicated by arrow A, cam 92 first allows pinch valve 66 to close, after which pinch valve 68 opens to allow the contents of the bag 50 to discharge into a vessel such as a paper cup, glass or the like, held below the discharge 60 of the hose 56. The rotation of the cam disk 94 is at a uniform rate, and the cam 90 may be of sufficient length to permit the complete gravity discharge of the contents of bag 50 before allowing the pinch valve 68 to close, or may allow the valve to close after a fixed period of time of shorter duration, to eliminate time consuming drip of the last remnants of the volume of liquid discharging from the bag 50. After allowing the valve 68 to close, the cam 92 opens valve 66, whereupon the container 30 discharges into bag 50 to refill the same. The valve 66 remains open while the rotation of the cam disk is stopped, at the position indicated by the button, after snap action of the switch 110 to one position and return of the switch to its normal biased position after passage of the button 96 beyond the follower 111.

Operation will best be understood by a reference to the circuit, wherein, assuming the bag 50 has filled sufficiently to close liquid level switch 108, the apparatus is ready to deliver a measured quantity of liquid from bag 50 into a cup, glass, vessel or the like. With switch 108 closed, relay coil 101 of relay 100 is energized and contacts 130, 132 and 134 are closed, and cam switch 110 is in the position shown, establishing a circuit from line 150 through contacts 130, signal lamp 112 and line 152, whereby readiness is indicated by illumination of the lamp 112.

Upon closing start switch 106, relay coil 103 of relay 102 is energized through contacts 132 to line 150, closing contacts 136, which provide a hold in circuit for relay 102, a circuit being established to line 152, through lead 146 and cam switch 110. A similar hold in circuit for relay 100 is established by contacts 134, lead 146 and cam switch 110.

In energizing relay 102, contacts 138 and 140 are reversed from the position shown, establishing a circuit to the motor 104, to line 152 through lead 142, and to line 150 through lead 144. The motor commences rotation of the cam disk 94 which opens pinch valve 68, allowing the bag 50 to collapse while discharging its contents into a vessel. As discharge commences, liquid level switch 108 opens, but both relays remain energized, by current from lead 146, connected to line 152 through cam switch 110, which remains in its biased position as shown.

When the motor has driven the cam disk so as to close discharge valve 68 it thereafter opens valve 66, and the button 96 actuates cam switch 110 to its opposite position, breaking the circuit energizing the relay coils 101 and 103 of both relays, but temporarily establishing an alternative circuit through lead 160, contacts 138 which have been returned to the position shown, through motor 104, and lead 144 to line 150. As soon as the button 96 clears cam switch 110, and allows it to return to the position shown, the circuit to the motor through lead 142 to line 152 is broken, and the alternative circuit through lead 160 has been opened to stop the motor, and the cycle is complete.

Since valve 66 is opened, bag 50 commences to fill from container 30. Unless it fills completely and thus closes the liquid level switch 108, relay 100 cannot be actuated by closing the start switch, and signal lamp 112 will not be energized, thus indicating that the bag 50 has not been filled, to its full measure, and hence no partial service, can be effected. In fact no operation can be effected, until bag 50 is filled and the liquid level switch 108 is closed. Thus the container 30 is indicated as having become empty, in only partially refilling bag 50 by the failure of the signal lamp 112 to light.

Figure 4:
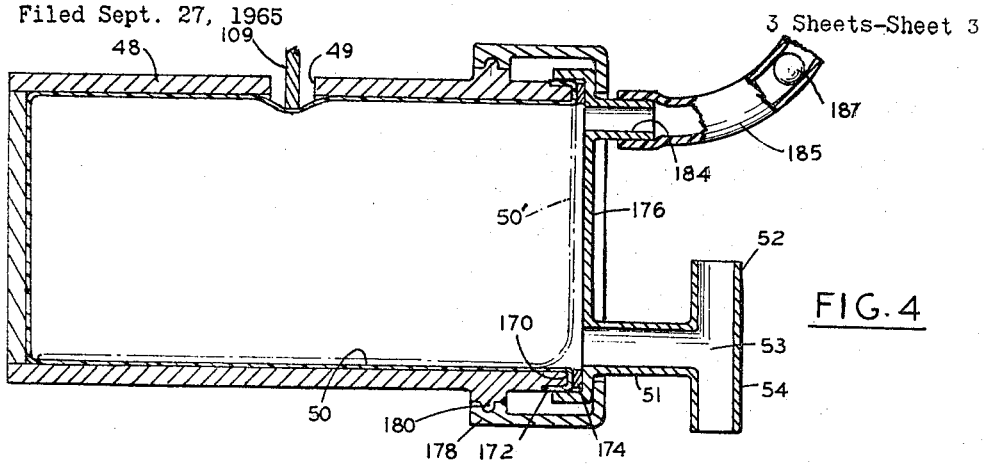
FIGURE 4 is a sectional view of the measuring container, liner and header.

In handling perishable liquids such as milk, sanitation of all of the parts coming in contact with milk is essential. This is accomplished by providing for the inexpensive replacement of all parts coming in contact with milk. The container 30 and its hose 36 are a single service assembly; that is, it is thrown away when empty. The cylinder 48, is so constructed with a removable and expendable cap and T 53 so as to render the cap 170, and the bag 50 replaceable as often as sanitation may require. As shown in FIGURE 4, the cylindrical container 48 is provided with a liner bag 50, the open end of which is outwardly cuffed over the mouth 170 of the container as at 172. As gasket 174 and cap disk or header 176 are applied to the mouth 170, as covered by the cuffed over bag end, and held in place under pressure by an annular flanged collar 178 having threaded connection 180 with the exterior wall of the container 48. The threads may be of the interrupted type to provide a bayonet connection that is quickly attached or detached. The cap disk or header 176 is so provided with the T 53, as to locate the bore of the stem 51, substantially tangential with the internal lower wall of the container, so that the bag 50 within the container 48 when the container is placed with its axis horizontal, will drain completely through the stem of the T. A vent 184 is provided in the cap disk diametrically across from the stem 51 of the T and at the top thereof, and is so disposed as to permit air, within the bag to be removed, through a tube 185 attached to the vent, the tube having an air bleed valve at its free end. Such bleed valve may be in the form of a spherical ball 187 in the end of the tube for a seal, which seal is broken to allow air to escape by distending the tube end. The branches 52 and 54 of the T 53 are such as to readily receive the hose 36 from the container 30, and the discharge hose 56 extending downwardly therefrom.

It will be seen that the container 48 with its bag and cap assembly and the hoses 36 and 56 attached, is so mounted within the housing as to align the hoses 36 and 56 with the male and female members of each of the pinch valves 66 and 68 respectively. Assuming the bag 50 has only partly filled, and drained the container supply 30, the container 30 with its hose 36 is replaced with a fresh container and hose, and the hose 36 of the fresh container is brought down into the active region of pinch valve 66, which is held open by cam 92, by reason of the end of the cycle having been previously reached. The end of the hose is brought into the path of the pinch valve 66. By manual actuation of the cam switch 110, the cam disk may be advanced a few degrees to a position where both pinch valves are closed to seal off the tube 36. The free sealed or plugged end of the tube 36 may then be severed from the tube, the open end of the tube projected onto the branch 52 of the T 53, after which the lever arm 70 of pinch valve 66 may be manually lifted to allow the bag 50 to fill. When refill is completed, such fact will be indicated by the energization of the signal lamp 112. Any air in the bag, at this time may be allowed to escape from the vent by manipulation of the tube about the ball seal. The apparatus is thus prepared in readiness for normal cycle, commenced by actuation of the start switch 106.

Initial operation is prepared for in the same way, the bag 50 being empty instead of partially full. At any time it is deemed desirable to replace the bag 50, cap and discharge hose, the container 48 is readily removed, then a new cap and bag applied, and the apparatus is thereafter prepared for operation in the same manner as set forth hereinabove. In fact the container is readily removable from its supports, to facilitate the making of connections with the hoses 36 or 56, or for the replacement of the head and bag 50, periodically as will be required to maintain sanitary conditions. It will be understood that such replacement will not be required as often as the replacing of a container 30, since all the parts are within the refrigerated area, and such replacement may not be required oftener than once a week or so, or the length of time milk or other liquid would normally be expected to keep within the refrigeration space.

When the device is used with a coin box, the proper coin detector switch functions in place of the start switch and the coin rejector magnet is connected in parallel with the indicator lamp 112 so that the coin will be rejected if the signal circuit is not energized.

Figure 5:
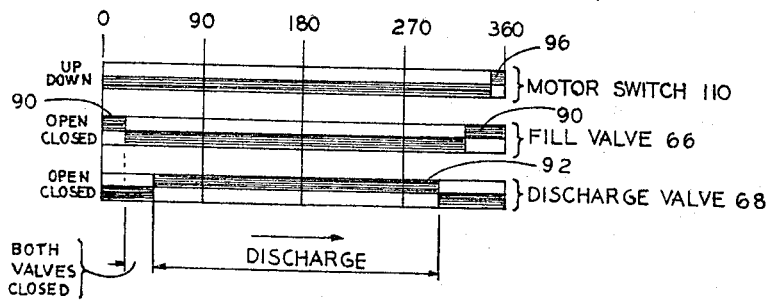
FIGURE 5 is a time chart of a cycle of operation.
Figure 6:
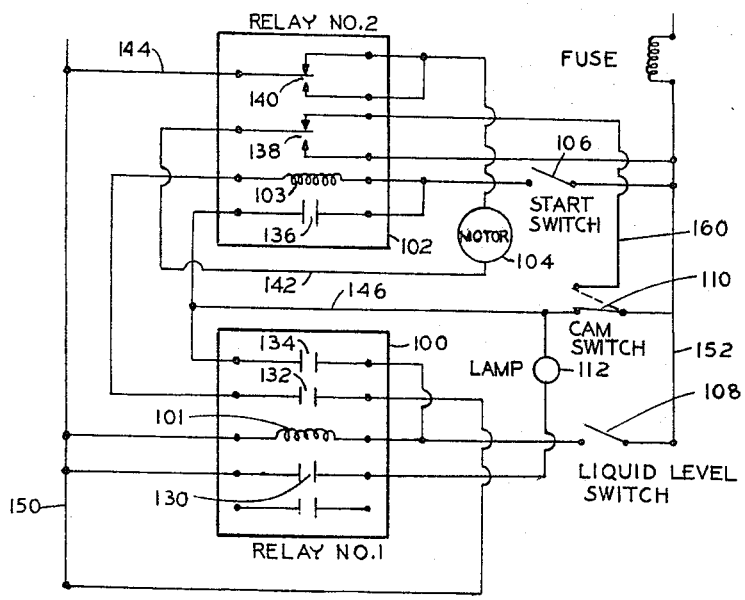
FIGURE 6 is a circuit diagram.

The diagram of FIGURE 5 shows the timing of the valves in relation to a cycle, or 360 degrees of rotation of the cam disk, as well as the momentary actuation at the end of the cycle of the switch 110, the dark areas indicating the alternately low and high points of the cams, and the cam like button.

It will appear that by altering the size of the container 48 either by mechanical means or by substitution, and employing an appropriate size liner, the volume delivered may be varied at will, assuming the cam timing allows substantially complete gravity discharge. The capacity of the liner as controlled by the measuring container determines the quantity of liquid discharged in each cycle of operation and, although the cam timing may be arranged to close the discharge valve while there is still a remnant of liquid in the liner, this is only done to avoid time consuming end dribble. Since discharge is by gravity at a constant head, the discharge time will of course be substantially constant. The diameters of the hose and fittings will be so chosen in relation to the product to be dispensed as to provide a seal by capillary action, so that once air is vented from the liner, at the start of a new container supply, no air will enter the system. Since the entire apparatus to the discharge tip 60 of hose 56 is within the refrigerator, the system is ideal for milk and other perishable products requiring refrigeration.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A liquid measuring device adapted to be connected to a source of liquid and comprising a rigid measuring container having and completely enclosing a thin flexible walled impervious liner of a size sufficient to fill out in lining relation to said container, means for delivery of liquid from a source of liquid to fill out said liner within said measuring container, including a fill valve to cut off delivery, and means for discharging by gravity the contents of said liner controlled by a discharge valve, means for opening said discharge valve only after closing said fill valve, and means for opening said fill valve only after closing said discharge valve, and means for rendering the device inoperative except when the liner is filled substantially to capacity within said measuring container.

2. A liquid measuring device comprising a rigid measuring container having a thin walled flexible impervious liner of a size sufficient to fill out in lining relation to said container, said container having a common inlet and discharge port for said liner disposed at a level to allow discharge by gravity from said liner, a T having its stem connected to said port and having an inlet branch and a discharge branch, a valve for each of said branches, means in a single cycle of operation for sequentially actuating said discharge valve to open position after actuating said inlet valve to closed position and for actuating said inlet valve to open position after actuating said discharge valve to closed position, and means for preventing a cycle of operation of said valve actuating means except when said liner is filled out in lining relation to said container prior to closure of said inlet valve.

3. A liquid measuring device comprising a rigid measuring container having a thin walled flexible impervious liner of a size sufficient to fill out in lining relation to said container, said container having a common inlet and discharge port for said liner disposed at a level to allow gravity discharge from said liner, a T having its stem connected to said port and having an inlet branch and a discharge branch, a fill hose connected to said inlet branch, and a discharge hose connected to said discharge branch, a pinch valve for each of said hoses including resilient means for urging each of the valves to closed position, means in a single cycle of operation for sequentially actuating said discharge valve to open position after actuating said inlet valve to closed position and for actuating said inlet valve to open position after actuating said discharge valve to closed position and means for preventing a cycle of operation of said valve actuating means except when said liner is filled out in lining relation to said container prior to closure of said inlet valve.

4. A liquid measuring device comprising a rigid measuring container having a thiln walled flexible impervious liner of a size sufficient to fill out in lining relation to said container, said container having a common inlet and discharge port for said liner disposed at a level to allow gravity discharge from said liner, a T having its stem connected to said port and having an inlet branch and a discharge branch, a fill hose connected to said inlet branch, and a discharge hose connected to said discharge branch, a pinch valve for each of said hoses including resilient means for urging each of the valves to closed position, cam means including a driving motor for sequentially actuating said discharge valve to open position after actuating said inlet valve to closed position and for actuating said inlet valve to open position after actuating said discharge valve to closed position in a single cycle of operation, and means for preventing energization of said motor and operation of said valve actuating means except when said liner is filled out in lining relation to said container prior to closure of said inlet valve.

5. A measuring device as set forth in claim 4, wherein the driving motor is of substantially constant speed, and wherein the interval between cam actuation of said discharge valve to open position and subsequently to closed position exceeds the normal discharge time for said liner, whereby the capacity of the liner as controlled by the container determines the quantity of liquid discharge on each cycle of operation.

6. A measuring device comprising a measuring container having a removable header and a thin walled flexible impervious liner of a size sufficient to fill out in lining relation to said container to provide a chamber composed of said liner and header, said header having a common inlet and discharge port for said liner disposed at a level to allow gravity discharge from said liner, a T having its stem connected to said port and having an inlet branch and a discharge branch, a fill hose connected to said inlet branch, and a discharge hose connected to said discharge branch, a pinch valve for each of said hoses including resilient means for urging each of the valves to closed position, means in a single cycle of operation for sequentially actuating said discharge valve to open position after actuating said inlet valve to closed position and for actuating said inlet valve to open position after actuating said discharge valve to closed position, and means for preventing a cycle of operation of said valve actuating means except when said liner is filled out in lining relation to said container prior to closure of said inlet valve.

7. A device as set forth in claim 6 wherein the header is provided with an air bleed port and a normally closed valve therefor.

8. A liquid measuring device for connection to a source of liquid comprising a rigid measuring container of predetermined capacity having and completely enclosing a thin flexible walled impervious liner of a size sufficient to fill out in lining relation to the container, means for delivering liquid from the source to the liner controlled by a fill valve and means for discharging liquid by gravity from the liner controlled by a discharge valve, actuating means for opening and closing the valves whereby the discharge valve can be opened only after closing the fill valve and the fill valve can be opened only after closing the discharge valve.

9. A liquid measuring device for connection to a source of liquid comprising a rigid measuring container of predetermined capacity having and completely enclosing a thin flexible walled impervious liner of a size sufficient to fill out in lining relation to the container, means for delivering liquid from the source to the liner controlled by a fill valve and means for discharging liquid by gravity from the liner controlled by a discharge valve, means for rendering the device inoperative upon insufficient liquid being available to fill out the liner to the predetermined capacity of the measuring container and actuating means for opening and closing the valves whereby the discharge valve can be opened only after closing the fill valve and the fill valve can be opened only after closing the discharge valve.

10. A liquid measuring device for connection to a source of liquid comprising a rigid measuring container of predetermined capacity having and completely enclosing a thin flexible walled impervious liner of a size sufficient to fill out in lining relation to the container, means for delivering liquid from the source to the liner controlled by a fill valve and means for discharging liquid by gravity from the liner controlled by a discharge valve, and means for rendering the device inoperative upon insufficient liquid being available to fill out the liner to the predetermined capacity of the measuring container.

11. The method of measuring a fixed quantity of liquid for discharge into a vessel, which comprises expanding a thin walled flexible liner into lining relation with a rigid fixed volume container completely enclosing the liner, by introducing liquid to be measured into the liner to fill out said liner to a full measure condition of substantially complete lining relation to the container, sensing said full measure condition, preventing the discharge of any of the contents of said liner except after sensing said full measure condition, and cutting off the supply of liquid to said liner upon the liner being filled out to full measure condition and discharging by gravity the contents of said liner into an open vessel without admission of air into the liner, only after sensing said liner to have been filled out to full measure condition.

References Cited
UNITED STATES PATENTS

| | | | |
|---|---|---|---|
| 55,151 | 5/1866 | Neynaber | 222—1 |
| 373,537 | 11/1887 | Smith | 222—442 X |
| 1,576,982 | 3/1926 | Mass | 222—64 |
| 1,650,192 | 11/1927 | Crouse | 222—64 |
| 2,321,836 | 6/1943 | Marzo | 222—105 X |
| 2,387,922 | 10/1945 | McBrien | 222—445 |
| 2,387,923 | 10/1945 | McBrien | 222—445 |
| 2,647,661 | 8/1953 | Harvey | 222—207 X |
| 2,817,461 | 12/1957 | Gilberty | 222—207 |
| 2,824,585 | 2/1958 | Andres | 222—447 X |
| 2,907,495 | 10/1959 | Brous | 222—129 X |

ROBERT B. REEVES, *Primary Examiner.*

KENNETH N. LEIMER, *Examiner.*